(No Model.) 3 Sheets—Sheet 1.

W. BORD & G. H. ENNIS.
DINNER PAIL.

No. 373,433. Patented Nov. 22, 1887.

WITNESSES
Geo. A. Darby.
Charles S. Brintnall

INVENTORS
William Bord
George H. Ennis by
W. E. Hagan their atty

N. PETERS, Photo-Lithographer, Washington, D. C.

(No Model.) 3 Sheets—Sheet 2.

W. BORD & G. H. ENNIS.
DINNER PAIL.

No. 373,433. Patented Nov. 22, 1887.

WITNESSES
Geo. A. Darby
Charles S. Brintnall

INVENTORS
William Bord
George H Ennis
W. E. Hagan their Atty (No Model.) 3 Sheets—Sheet 3.

W. BORD & G. H. ENNIS.
DINNER PAIL.

No. 373,433. Patented Nov. 22, 1887.

WITNESSES
Geo. A. Darby.
Charles S. Bucknall

INVENTORS
William Bord
George H. Ennis by
W. E. Hagan their atty

United States Patent Office.

WILLIAM BORD, OF GREEN ISLAND, AND GEORGE H. ENNIS, OF TROY, NEW YORK.

DINNER-PAIL.

SPECIFICATION forming part of Letters Patent No. 373,433, dated November 22, 1887.

Application filed March 15, 1887. Serial No. 231,068. (No model.)

*To all whom it may concern:*

Be it known that we, WILLIAM BORD, of Green Island, Albany county, State of New York, and GEORGE H. ENNIS, of the city of Troy, Rensselaer county, State of New York, have jointly invented new and useful Improvements in Dinner-Pails, of which the following is a specification.

Our invention relates to that class of pails that are used by workmen for containing food, and which are termed "dinner-pails;" and our improvements have for their object an improved means of ventilating the interior of the pail, an improved interior construction for containing food, and an improved connected construction of the cover, pail-body, and bail.

Accompanying this specification, to form a part of it, there are three sheets of drawings, containing nine figures illustrating our invention, with the same designation of parts by letter reference used in all of them.

Figure 1:
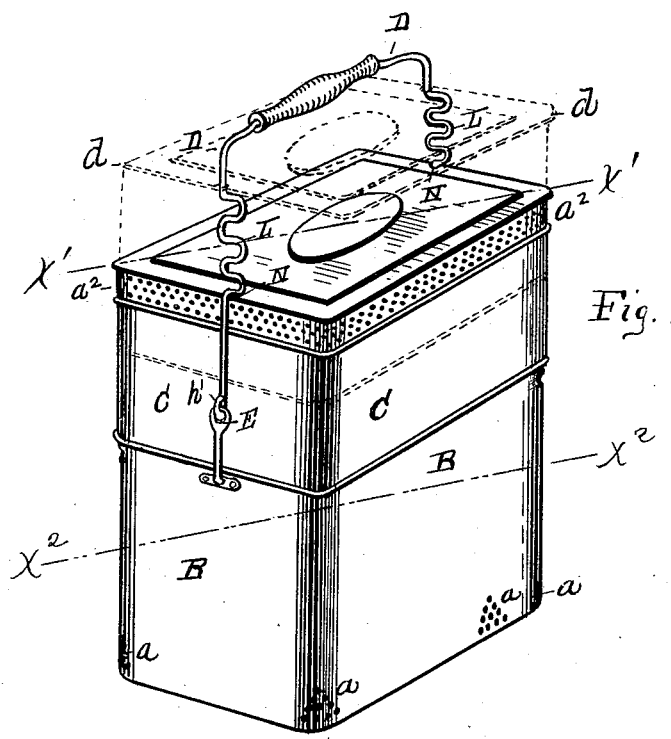
Figure 2:
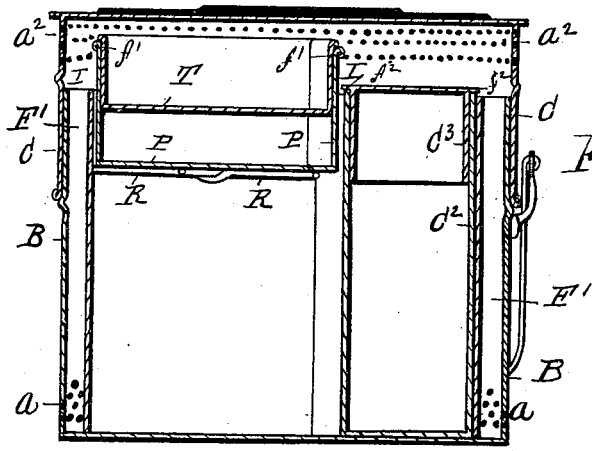
Figure 3:
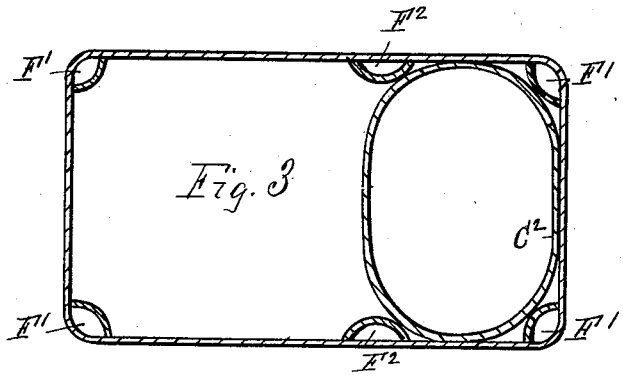
Figure 4:
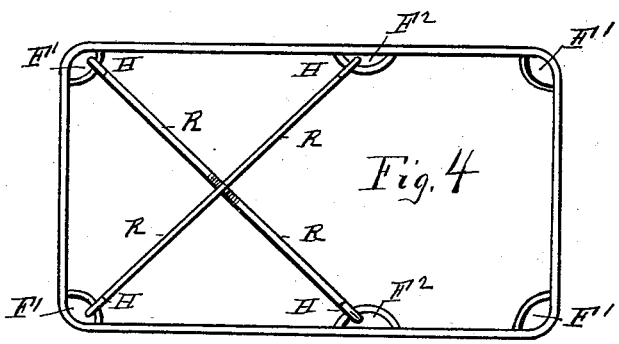
Figure 5:
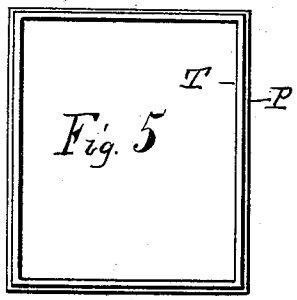
Figure 6:
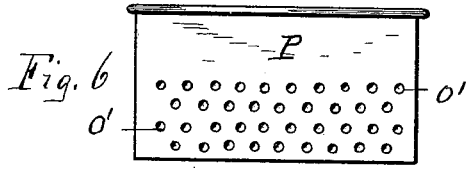
Figure 7:
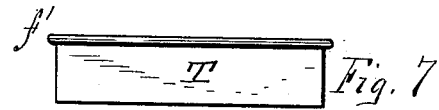
Figure 8:
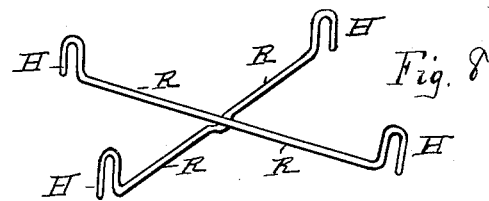
Figure 9:
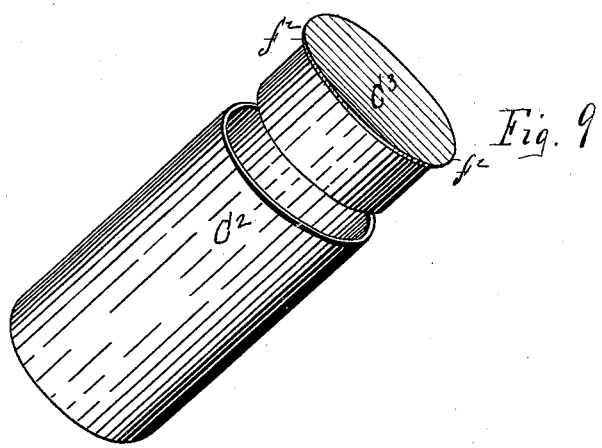

Of the illustrations, Figure 1 is a perspective of our improved dinner-pail. Fig. 2 is a section taken diagonally on the line $x'$ $x'$ of Fig. 1. Fig. 3 is a section taken horizontally and transversely on the line $x^2$ $x^2$ of Fig. 1. Fig. 4 is a top view of the pail, with the cover and interior parts removed with the exception of the rack-support. Fig. 5 is a top view of a pan and tray removed from the pail. Fig. 6 is a side elevation of the pan. Fig. 7 is a side elevation of the pan-tray separated from the pan. Fig. 8 is a perspective of the supporting-rack on which the pan-containing tray rests. Fig. 9 is a perspective of the can removed from the pail, showing also its telescopic cover removed therefrom.

The several parts of the pail thus illustrated are designated by letter reference, and their function is described as follows:

The letter B indicates the body of the pail, which has rectilinear sides with rounded corners.

The letter F' indicates ventilating-flues arranged in the opposite corners, and $F^2$ like flues in the sides of the pail-interior, each of which flues at its lower end is constructed with apertures $a$, which open out therefrom.

The letter C designates the cover of the pail, which at its upper end is provided with ventilating-apertures $a^2$ along its upper edge. These apertures connect with the interior of the cover and pail and that part of it into which the upper ends of the flues F' and $F^2$ open. The cover of the pail slides down over the body telescopically. The subtending upper edge of the pail-cover is constructed with a notch, N, at each of its ends, and the letter D indicates a bail that is attached to the side of the pail-body by means of eyes E, secured on the body, and a hook, $h'$, at each end of the bail.

The letters L indicate lock-notches formed in the bail-sides, by means of which the cover-notch N may be oppositely locked in said bail when telescopically raised, as shown by the dotted line $d$ of Fig. 1. This upward extension of the cover and the means for locking the cover so raised into the bail furnishes facilities for increasing the receiving-area of the pail and securing it as thus placed.

The side flues, $F^2$, are arranged at such distance from the ends as will permit them to enter the interior I, formed by the cover and body, and in which the pan P and can $C^2$ are placed.

The letter R designates a rack, which at its outer corners is arranged, by means of its hook-form ends H, to hook into the two adjacent corner flues, F', and the two side flues, $F^2$. The function of this rack is to receive and retain the pan P securely within the pail-interior. This pan P is made with ventilating apertures O', arranged in its sides and below that part of said pan which receives the tray T, the latter being made with a projecting flange, $f'$, upon its upper edge to prevent its settling down in the pan, said flange, when the tray is placed within the pan, resting upon the upper edge of the latter. The can $C^2$ has a telescopically-arranged cover, $C^3$, that is also provided with a flange, $f^2$, by which the cover is grasped to withdraw it when desired. As thus arranged, that part of the pail-interior below the rack may be used to receive solid food, the can liquid food, and the pan and tray other kinds of food, and with the fumes or odors coming from them provided with means to escape from the pail, so that they will not commingle, to impregnate each kind of food with the odor of the others.

In some of its features our invention relates to improvements upon the pail described and shown in Letters Patent No. 320,454, granted to William Bord, of Green Island, New York, June 23, 1885. In said older patent the whole exterior of the pail and cover was filled with apertures, and in our improvement, as shown herein, ventilating-flues are arranged within the pail, which open out from the latter at their lower ends, and at their upper ends open out into the pail-interior, with apertures in the cover immediately below its top.

Having thus described our invention, what we claim, and desire to secure by Letters Patent, is—

1. The combination, with a dinner-pail, of the flues F', arranged in the corners thereof, said flues being provided with apertures at their lower ends opening out therefrom, and having their upper ends opening out into the pail-interior, and a cover provided with apertures in its sides opening out from the cover-interior, substantially as and for the purposes set forth.

2. The combination, with a dinner-pail, of the flues F', arranged in the corners thereof, the flues F², arranged in the sides thereof, both of said flues being provided with apertures at their lower ends opening out therefrom, and a pail-cover provided with apertures in its sides opening out from the cover-interior, substantially as and for the purposes set forth.

3. In a dinner or food pail having rectilinear sides and rounded corners and a telescopically-fitting cover, ventilating-flues arranged in the pail-interior at the corners, said ventilating-flues having apertures at their lower ends opening out through the pail-exterior and at their upper ends connecting with the pail-interior, and ventilating-apertures in the cover-sides opening out from the pail-interior, substantially as and for the purposes set forth.

4. In a dinner or food pail, the combination of the flues F', arranged in the corners thereof, the flues F², arranged in the sides thereof, with said flues each constructed with apertures opening out therefrom at their lower ends and at their upper ends connecting with the pail-interior, and the rack R, constructed substantially as described and arranged to rest in the tops of two of the end flues and two of the side flues, substantially as and for the purposes set forth.

5. In a dinner or food pail, the combination of a bail adapted to hook into the body of the pail at the sides thereof, said bail being provided with notches in one of the sides, and a cover adapted to telescopically connect with the pail-body, said cover at its sides being constructed with a notch or slit adapted to engage with the notches of the bail, substantially as and for the purposes set forth.

Signed at Troy, New York, this 22d day of February, 1887, in the presence of two witnesses, whose names are hereto written.

WILLIAM BORD.
GEORGE H. ENNIS.

Witnesses:
CHARLES S. BRINTNALL,
GEO. F. HYDE.